Sept. 20, 1927.

L. W. LESSLER ET AL 1,642,818

FILM WINDING MECHANISM FOR CAMERAS

Original Filed March 13, 1926    3 Sheets-Sheet 1

INVENTOR
LEW W. LESSLER.
CARL A. BORNMANN
BY Philip S. Hopkins
ATTORNEY

Sept. 20, 1927.  1,642,818
L. W. LESSLER ET AL
FILM WINDING MECHANISM FOR CAMERAS
Original Filed March 13, 1926   3 Sheets-Sheet 2
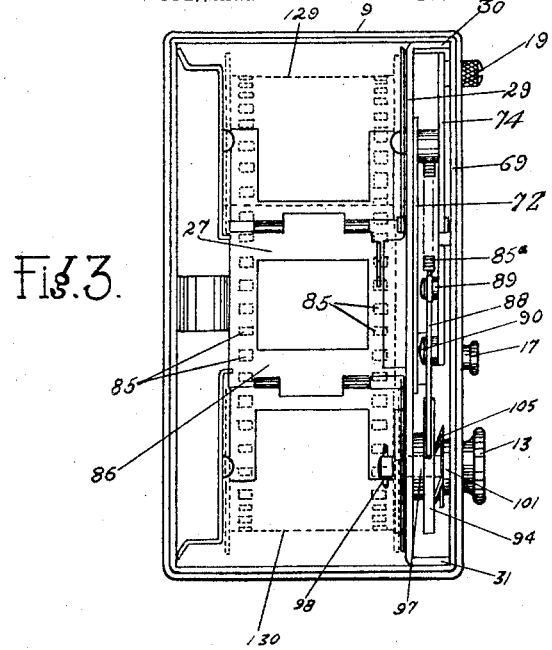
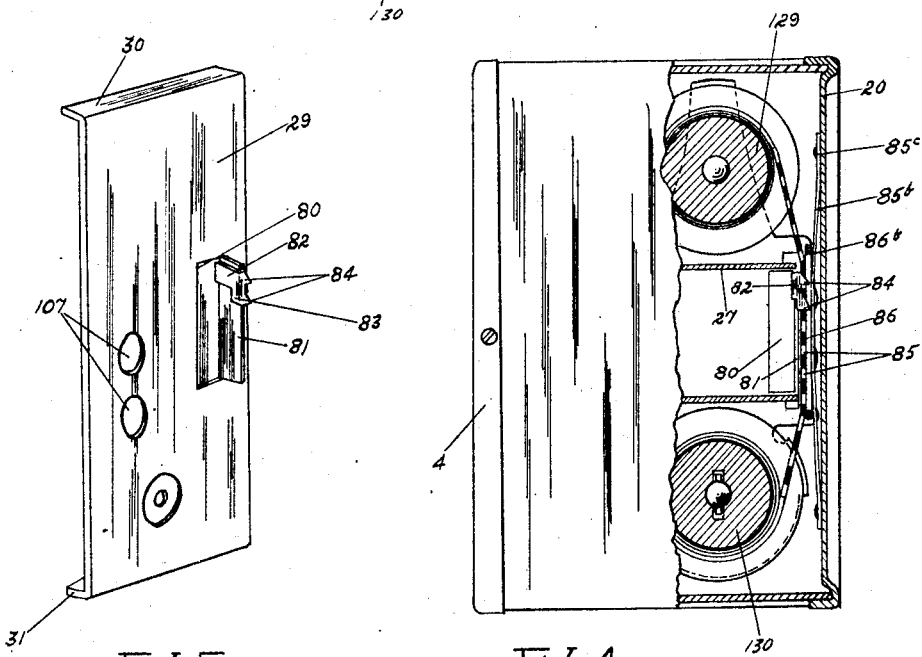
INVENTOR
LEW W. LESSLER
CARL A. BORNMANN
BY
ATTORNEY Sept. 20, 1927.  
L. W. LESSLER ET AL  
1,642,818
FILM WINDING MECHANISM FOR CAMERAS
Original Filed March 13, 1926   3 Sheets-Sheet 3
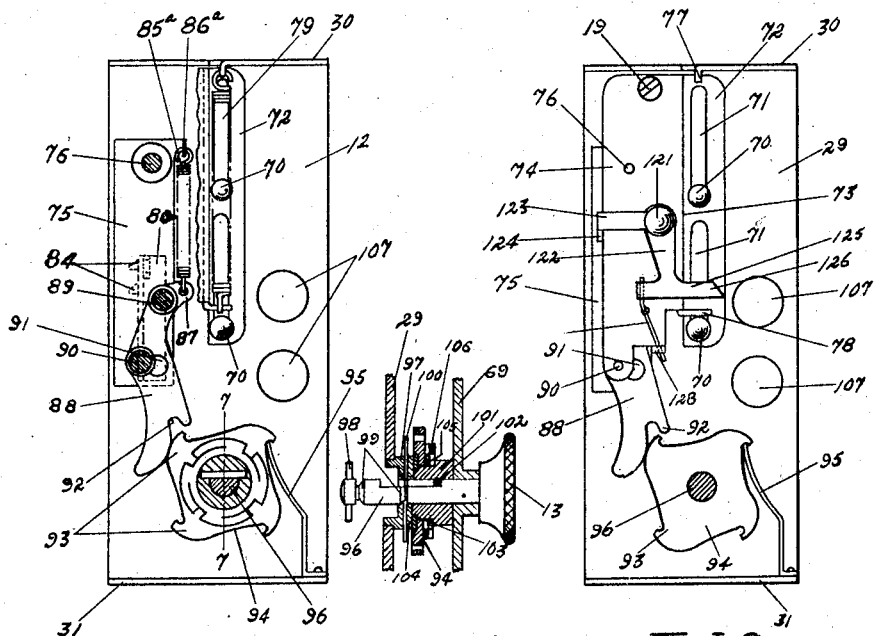
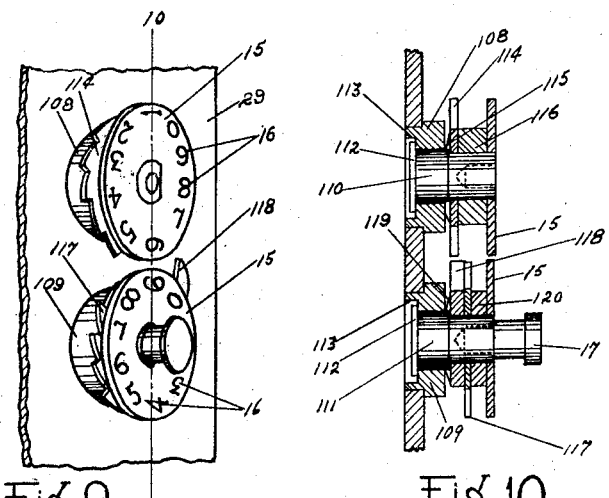
INVENTOR  
LEW W. LESSLER  
CARL A. BORNMANN  
BY  
ATTORNEY Patented Sept. 20, 1927.

1,642,818

UNITED STATES PATENT OFFICE.

LEW W. LESSLER, OF JOHNSON CITY, AND CARL A. BORNMANN, OF BINGHAMTON, NEW YORK, ASSIGNORS TO ANSCO PHOTOPRODUCTS, INC., OF BINGHAMTON, NEW YORK.

FILM-WINDING MECHANISM FOR CAMERAS.

Original application filed March 13, 1926, Serial No. 94,496. Divided and this application filed October 16, 1926. Serial No. 142,003.

This application is a division of our copending application Serial No. 94,496 filed March 13, 1926.

Our invention relates to photographic cameras and particularly to a camera which is adapted to take comparatively small pictures on a long length of film. Cameras of this type are especially useful for recording pictorially any particular event or series of events wherein it is desired to take a great many pictures in succession and in sequence without being required to stop every little while and change the film in the camera. In other words, the camera, though small in construction, is provided with means for accommodating a roll of film upon which may be exposed 50 or 100 or even more pictures on one loading.

The ordinary standard moving picture film is preferably used in this improved camera, although of course the camera need not be limited to such film. The pictures produced by this camera are especially adapted for reprinting on a second strip of positive film from which they may be projected upon a screen in an enlarged form by any suitable projecting lantern.

The principal object of our invention is provide the camera with a simple and efficient film winding device which is quick acting by means of a sliding control lever, and which controls the regular winding and spacing of the film as it is drawn from the supply spool to the take up spool in the camera. This winding mechanism included besides an ingenious arrangement for compensating for the varying diameters of the spools, a clever numbering arrangement which, visible through the side of the camera, indicates to the operator the number of exposures which have been made.

The construction and mounting of this indicator or counter forms another object of this invention.

Many other details on this camera are the result of further objects and advantages of the invention and all contribute to the production of a small, compact, simple operating and efficient picture taking machine of the character described.

In the accompanying drawings, wherein like reference numerals indicate like parts:—

Figure 3 is a rear view of the camera with the back removed showing the winding mechanism in assembled position and illustrating in dotted lines the film within the camera.

Figure 4 is a side view of the camera, parts being broken away to show in assembled relation the spool carriage within the camera and the operation of the presser pad carried by the back on the film as it is wound through the camera.

Figure 5 is a detail perspective view of the frame or partition carrying the winding mechanism.

Figure 6 is a detail side view showing the winding mechanism for the film.

Figure 7 is a detail sectional view taken on the line 7—7 of Figure 6.

Figure 8 is a detail view similar to Figure 6 with certain parts being omitted for clearness of illustration.

Figure 9 is a detail perspective of the indicator or counter disks.

Figure 10 is a section taken on the line 10—10 of Figure 9.

Figure 1:
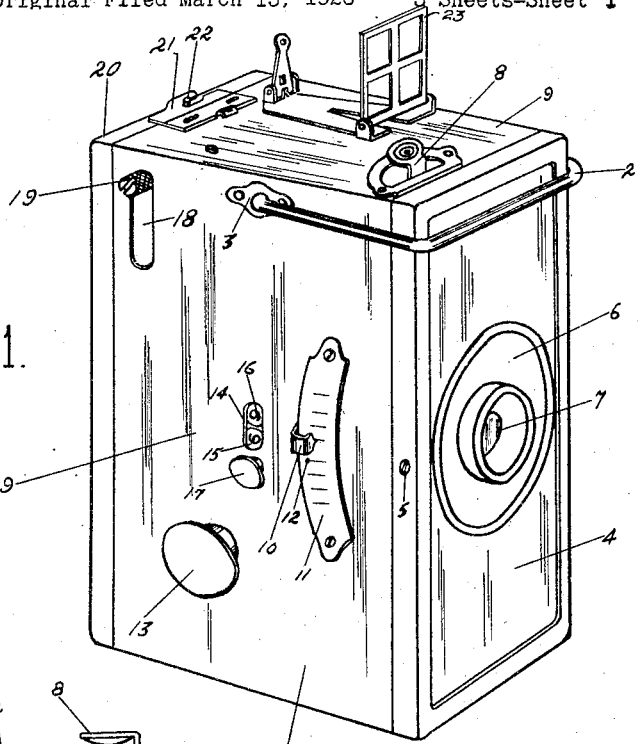
Figure 1 is a perspective view of our improved camera assembled.

Referring now more particularly to Figure 1 of the drawing, wherein we have indicated generally our camera by the reference numeral 1, 2 represents the carrying handle therefor, suitably secured to either side of the camera as by means of the brackets 3. The front plate 4 of the camera is secured to the body as by means of screws 5 and is provided centrally with a cover piece 6 surrounding an opening 7 through which the exposure is made. The upper end 8 of the shutter operating lever projects through an opening in the top 9 of the camera for ready manipulation.

A focusing lever 10 which also serves as a pointer operating over the focusing scale 11, suitably secured to the side of the camera, provides means for focusing the shutter carried within the camera. The focusing scale is provided with an indentation or recess 12 at the point of approximate universal focus, whereby the end of the pointer 10 may be frictionally held in such position. The button 13 is the outer end of a key pin for cooperating with the film spool, the details of which will be described later.

The side 69 of the camera is provided centrally with an aperture 14 through which are visible the adjacent edges of indicator or counter disks 15 bearing the indicating numerals 16. A knob or button 17 provides means whereby the operator may set the indicator to "zero" or to any desired number. The details of this mechanism will be described more fully later. Near the upper rear corner of this side of the camera is provided a recess 18 which is elongated vertically to provide a pathway for the projecting end 19 of the lever which controls the film winding mechanism.

The back 20 of the camera is held in position by means of the sliding catch 21 carried by the top of the camera and cooperating with the pins 22 carried by the back.

A collapsible direct view finder 23 is located on top of the camera for the proper location and centering of the objects to be photographed.

Referring now to Figure 3 of the drawings, it will be seen that a partition plate 29 is provided adjacent one side of the camera body and extending between the front and back of the camera. The upper and lower edges 30 and 31 of this partition plate are turned at right angles whereby the plate is suitably spaced from the adjacent side of the camera. These spacing flanges 30 and 31 also act as light locks against the admission of light to the film chamber through the openings 14 and 18 in the side of the camera.

The space between the partition 29 and side wall 69 of the camera body provides a compartment for the mechanism which winds the film from one spool to another. This mechanism will now be described. Referring particularly to Figure 8 of the drawing, it will be noted that upon the inner side of the partition plate 29 there is slidably mounted, as by means of a pin and slot connection 70 and 71, the reciprocating slide 72. This slide is offset as at 73 so that the portion 74 of the slide is spaced from the partition plate 29, as clearly illustrated in Figure 3. Another slide 75 parallel with the portion 74, and secured thereto pivotally as at 76, lies flush against the inner surface of the partition 29. This is clearly shown in Figure 6. An ear 77 is turned downwardly from the upper flange 30 of the partition plate 29 and a second ear 78 is formed on the slide 72. A coil spring 79 (see Figure 6) has an end secured to each of the these ears and normally holds the slide 72 with its offset portion 74 and the slide 75 in their uppermost position. The screw finger piece 19, referred to in connection with Figure 1, is positioned at the upper end of the slide portion 74 and projects outwardly through the recess 18 in the side 69 of the camera box. It is by means of this screw finger piece that the slide 74 is manipulated by the operator in a manner to wind the film from one spool to another.

It should be noted here that the partition plate 29 intermediate its ends and at a point opposite the edge of the path of the film is provided with a cut out portion 80. The material from this cut out portion is bent outwardly at right angles forming a guide 81 (see Figure 5). The slide 75 carries an outstanding lug or arm slidably along the surface of the guide 81. This lug is indicated by reference character 82 and has its free end bent at right angles over and projecting beyond the edge of the guide 81. This free end 83 is provided with spaced teeth 84 adapted to engage within the perforations 85 of the film 86 and upon reciprocation of the slide 75 to draw said film downwardly from the upper or supply spool. The slide 75 is pivotally mounted to the slide 74 at the point 76 and is normally maintained in its outward or film engaging position by means of the coil spring $85^a$ secured at one end to the lug $86^a$ carried by the slide 75 above its pivot, and secured at its lower end to the upper free end 87 of a pivoted lever or dog 88 (see Figure 6). It will be noted that the upper sides of the teeth 84 are bevelled and as the slide 75 is carried upwardly on its return stroke by the spring 79, these bevelled edges of the teeth 84 engage the film between the perforations and are forced inwardly thereby past the edge of the guide 81 until the slide 75 reaches its normal position, whereupon the teeth 84 will be forced into engagement with an adjacent pair of perforations in the film, the spring $85^a$ causing such engagement.

As disclosed in Figure 4, the back 20 of the camera is provided with a longitudinal leaf spring $85^b$, guided by pins $85^c$. The spring carried centrally thereof, a presser pad $86^b$ which engages resiliently against the film 86 as it passes over the end of the housing 27 of the spool carriage. The presser pad $86^a$ is suitably provided with an elongated slot (not shown) for permitting the passage of the teeth 84 to pass therethrough when in engagement with the film perforations.

The lever 88 is pivoted to the slide 74 at 89, and is guided in its pivotal movement by a pin 90 operating in a slot 91 in said lever. It will be noted with reference to Figure 6 that the coil spring $85^a$ engaging with the free end 87 of this lever operates to normally hold the lower end of the lever inwardly, or to the right. The lower end of the lever 88 is provided with a recess 92 for engaging one of the teeth 93 of a rotatable disk 94. A flat leaf spring 95 or other suitable means is provided to engage the disk 94 to prevent free rotation thereof and to prevent it turning in but one direction.

The disk 94 is rotatably and slidably mounted upon a shaft 96 terminating at its outer end, after passing through the side of the camera, in the turn button 13 as shown in Figure 1. Referring now to Figure 7, it will be noted that the partition 29 is provided with a bushing 97 and a central opening through which passes the shaft 96. The shaft 96 carries at its inner end a key pin 98 for engaging within the key slot in the adjacent end of the film spool, whereby upon rotation of the shaft 96, said spool will also be rotated.

This shaft 96 is also provided adjacent its inner end with shouldered recesses 99, within which engages a small resilient spring 100, whereby said shaft is frictionally held in its spool engaging or disengaging position. A shouldered portion 101 is keyed to the shaft 96 as at 102 for rotary motion therewith and to permit sliding motion of the shaft 96 with respect thereto. Between one of the shoulders 103 of this bushing and a washer 104 is rotatably mounted the disk 94. Also secured upon the bushing 101 and having frictional engagement against the outer disk 104 is a spring washer 105. This washer, as clearly shown in Figure 7, is provided with integral resilient spring tongues 106 which bear against and act as a brake upon the disk 94.

This friction arrangement permits a slippage between the driving disk 94 and the film spool whereby to compensate for the varying diameter of the take up spool as the film is wound thereon. In other words, this connection prevents more than the required amount of film being wound upon the take up spool as said spool is rotated by means of the shaft 94.

It will be apparent that when the operator presses downwardly upon the pin or thumb piece 19, the slide 72, together with the raised portion 74 thereof, and the slide 75, will be moved downwardly, during which movement the teeth 84 carried by the slide 75 will engage and pull downwardly section of film equal to the width of the exposure. At the same time, the pivoted lever 88 will engage with the disk 94, which because of its frictional engagement with the shaft 96, will rotate the spool to take up the film so pulled, and the spring 79 will then return the slides to their normal position.

Figure 2:
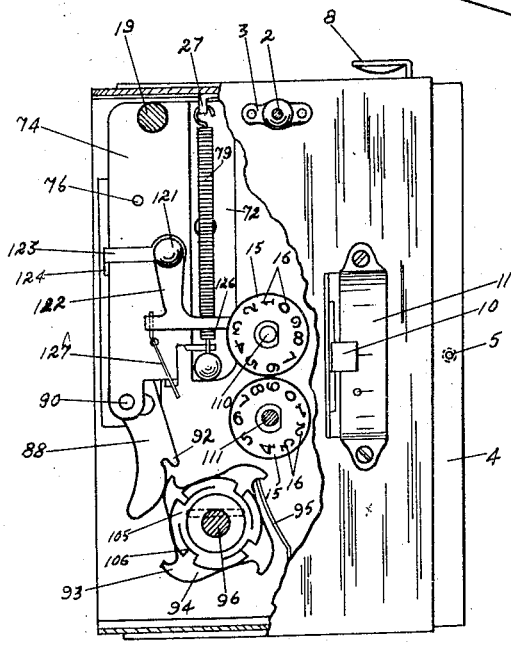
Figure 2 is a side view of the camera, with parts being broken away for clearness in illustrating the winding mechanism.

With reference now to Figures 2, 9 and 10, a novel form of indicator or counter device for cooperating with the film moving mechanism has been illustrated and the construction of which will now be described. The partition 29 is provided with two openings, 107, within which are mounted the bushings 108 and 109. These bushings are centrally recessed to receive the pins 110 and 111 provided at one end with the disks 15 bearing the indicating numerals 16. The opposite ends of the pins 110 and 111 are provided with washers 112 lying within the countersunk portions 113 of the bushings 108 and 109, thereby bringing the washers substantially flush with the plane of the partition 29.

The pin 110 is provided with a toothed disk 114 keyed thereto. A spring washer 115 lies between the disk 114 and the bushing 108, and a spaced washer 116 lies between the disk 114 and the counter disk 15.

The pin 111 is also provided with a toothed disk 117 lying in a plane offset from that of the toothed disk 114. Also secured to the pin 111 between the toothed disk 117 and the bushing 109 is a prong or finger 118 engageable at each revolution of the pin 111 with one of the teeth of the disk 114. It will be understood therefore, that upon each complete revolution of the pin 111, the disk 114 will be advanced a distance of one tooth. A spring washer 119 lies between the bushing 109 and the face of the finger member 118, and the spacer washer 120 lies between the toothed disk 111 and the adjacent counter disk 15.

The pin 111 also carries at its outer end, projecting through the side wall 69 of the camera, the finger button 17 whereby the disk may be rotated by hand, and set to any given point of indication on the disks 15, visible through the opening 14 shown in the side of the camera in Figure 1.

Referring more particularly now to Figures 2 and 8, it will be observed that pivoted to the sliding member 74 intermediate its ends at 121, is a lever 122, having one end 123 engageable against a fixed ear or lug 124 turned up from the edge of the slide member 74. The opposite end 125 of this lever occupies a horizontal position, and the pointed nose 126 thereof lies in a plane the same as that occupied by the toothed disk 117 on the pin 111. It will be understood, therefore, that as the slide member 74 is moved downwardly, the nose 126 will engage with a tooth on the disk 117 rotating such disk and the pin 111 together with the indicating or counter disk 15, the space of one tooth. It will also be noted that as the nose 126 engages with the tooth on the disk 117, such engagement will be rigid due to the fact that the opposite end of the lever 122 engages rigidly with the lug 124. Upon the upward movement of the slide 74, however, should the end 125 of the lever 122 engage any part, the lever 122 will rock on its pivot 121 thereby allowing the nose 126 to pass such obstruction freely. A small leaf spring 127 is anchored at one end as at 128 to the lower end of the slide 74 and engages at its opposite end with the end 125 of the lever 122. This spring normally urges the lever to the position shown in Figure 8 or to tooth engagement position.

From the foregoing, it will be understood that upon one complete revolution of the toothed disk 117 and the pin 111, the finger 118 will engage with one of the teeth of the disk 114, thereby moving it and the pin 110 together with its counter disk 15, the space of one tooth.

The film supply spool is indicated in Figures 3 and 4 at 129 and the take up spool at 130. Briefly, the operation of the novel film winding mechanism and indicator above described is as follows:—

After making an exposure on the film 86, the operator pushes downwardly on the finger piece 19, which moves downwardly in the slot 18. This downward motion causes the slide member 72 to which the finger piece 19 is attached to also move downwardly guided by the pins 70 in the slot 71. As the slide member moves down, the pivoted slide 75 also moves downwardly carrying with it the angular lug 82 and the teeth 84 which, operating through the opening 80 in the partition 29, engage within the perforations 85 of the film 86 causing such film to move downwardly over the exposure opening in the film carriage 27. Simultaneously with this movement of the film, the lever 88 carried by the slide member 74 in its downward movement engages with a tooth on the disk 94 causing it to rotate, which in turn through the key shaft 96 rotates the take up spool 130 to wind the film thereon. If, due to the large diameter of the take up spool, it does not require the complete movement of the spool imparted to it by the lever 88, to wind the film pulled off of the supply spool, the friction clutch mechanism illustrated in Figure 7 will function to compensate for this.

Also upon the downward movement of the slide 72, the lever 122 engages with a tooth on the disk 117 causing it to rotate the distance of one tooth to bring a new indicating number on the disk 15 into position through the window 14 in the side of the camera to indicate the number of exposures that have been made.

Of course, many changes in details of construction and operation may be made without departing from the spirit and scope of our invention. We do not limit ourselves therefore to the exact structure shown and described other than by the appended claims.

We claim:—

1. A film winding mechanism for cameras comprising a support, a slide guided on said support, means normally urging said slide in one direction, a finger piece for moving said slide in the opposite direction, and means on said slide and extending through said support to and engaging film strip for moving the same.

2. A film winding mechanism for cameras comprising a support, a slide guided on said support, a portion of said slide being offset from said support, means normally urging said slide in one direction, a finger piece for moving said slide in the opposite direction, and a plate pivoted to the under side of said offset portion, and having teeth extending through said support to and engaging film strip for moving the same.

3. A film winding mechanism for cameras comprising a support, a slide guided on said support, a portion of said slide being offset from said support, means normally urging said slide in one direction, a finger piece for moving said slide in the opposite direction, and a plate pivoted to the under side of said offset portion, and having teeth extending through said support to and engaging film strip for moving the same, said plate being resiliently urged to such film engaging position.

4. A film winding mechanism for cameras comprising a support, a slide guided thereon, a portion of said slide being offset from said support, means normally urging said slide in one direction, a finger piece for moving the same in the opposite direction, a plate pivoted to the underside of said offset portion and lying adjacent said support, said support being provided with an aperture covered by said pivoted plate, and film engaging means carried by said plate and extending through said aperture to and engaging film strip for moving the same.

5. A film winding mechanism for cameras comprising a support, a slide guided thereon, a portion of said slide being offset from said support, means normally urging said slide in one direction, a finger piece for moving the same in the opposite direction, a plate pivoted to the underside of said offset portion and lying adjacent said support, said support being provided with an aperture covered by said pivoted plate, and film engaging means carried by said plate and extending through said aperture to and engaging film strip for moving the same said film engaging means comprising a finger rigid with said pivoted plate and provided at its free end with spaced teeth parallel with said plate.

6. A film winding mechanism for cameras comprising a support, a slide guided thereon, a portion of said slide being offset from said support, means normally urging said slide in one direction, a finger piece for moving the same in the opposite direction, a plate pivoted to the underside of said offset portion and lying adjacent said support, said support being provided with an aperture covered by said pivoted plate, and film engaging means carried by said plate and extending through said aperture to and engaging film strip for moving the same said film engaging means comprising a finger rigid with said pivoted plate and provided at its free end with spaced teeth parallel with said plate, and a guide for said finger and teeth formed from the material struck up from said aperture in the support.

7. A film winding mechanism for cameras comprising a support, a slide guided thereon, a portion of said slide being offset from said support, means normally urging said slide in one direction, a finger piece for moving the same in the opposite direction, a plate pivoted to the underside of said offset portion and lying adjacent said support, said support being provided with an aperture covered by said pivoted plate, and film engaging means carried by said plate and extending through said aperture to and engaging film strip for moving the same said film engaging means comprising a finger rigid with said pivoted plate and provided at its free end with spaced teeth parallel with said plate, and a guide for said finger and teeth formed from the material struck up from said aperture in the support, said teeth normally projecting beyond the edge of said guide.

8. A film winding mechanism for cameras comprising a support, a slide guided thereon, a portion of said slide being offset from said support, means normally urging said slide in one direction, a finger piece for moving the same in the opposite direction, a plate pivoted to the underside of said offset portion and lying adjacent said support, said support being provided with an aperture covered by said pivoted plate, and film engaging means carried by said plate and extending through said aperture to and engaging film strip for moving the same said film engaging means comprising a finger rigid with said pivoted plate and provided at its free end with spaced teeth parallel with said plate, and a guide for said finger and teeth formed from the material struck up from said aperture in the support, said teeth normally projecting beyond the edge of said guide, and spring means connected to said pivoted plate for permitting said teeth to be forced back from said projecting position in one direction of movement of said slide.

9. A film winding mechanism for cameras comprising a support, a slide guided thereon and normally urged in one direction, a finger piece for moving said slide in the opposite direction, means carried by said slide and extending through said support to and engaging film strip for moving the same a winding key on said support, a toothed disk frictionally secured to said key, and means on said slide for engaging and rotating said disk.

10. A film winding mechanism for cameras comprising a support, a slide guided thereon and normally urged in one direction, a finger piece for moving said slide in the opposite direction, film engaging and moving means carried by said slide and extending through said support, a winding key on said support including a stem, a toothed disk rotatable on said stem, a spring washer rigid with said stem and frictionally engaging said disk whereby rotation of said disk normally causes rotation of said stem, and means carried by said slide and operative upon movement thereof in one direction, for rotating said disk.

11. A film winding mechanism for cameras comprising a support, a slide guided thereon and normally urged in one direction, a finger piece for moving said slide in the opposite direction, film engaging and moving means carried by said slide and extending through said support, a winding key on said support including a stem, a toothed disk rotatable on said stem, a spring washer rigid with said stem and provided with spring fingers engaging said disk whereby rotation of said disk normally causes rotation of said stem, and means carried by said slide and operative upon movement thereof in one direction for rotating said disk.

12. A film winding mechanism for cameras comprising a support, a slide guided thereon and normally urged in one direction, a finger piece for moving said slide in the opposite direction, film engaging and moving means carried by said slide, a winding key on said support for engaging a film spool, and means on said slide for rotating said key at each operation of said slide, said means comprising a pivoted dog.

13. A film winding mechanism for cameras comprising a support, a slide guided thereon and normally urged in one direction, a finger piece for moving said slide in the opposite direction, film engaging and moving means on said slide, a winding key journaled in said support for engaging a film spool, said key including a toothed driving disk, a pivoted dog on said slide for engaging said disk and rotating the same upon each operation of the slide, and resilient means for normally urging said dog to disk engaging position.

14. A film winding mechanism for cameras comprising a support, a slide guided thereon and normally urged in one direction a finger piece for moving said slide in the opposite direction, film engaging and moving means on said slide, a counting device on said support including toothed wheels, and means on said slide engaging one of said toothed wheels upon each operation of said slide.

15. A film winding mechanism for cameras comprising a support, a slide guided thereon and normally urged in one direction, a finger piece for moving said slide in the opposite direction, film engaging and moving means on said slide, a counting device on said support including toothed wheels carrying indicator disks, a pivoted pawl on said slide engaging with one of said toothed wheels upon each operation of said slide, said pawl being rigid during the movement of said slide in one direction and rockable during such movement in the opposite direction.

16. A film winding mechanism for cameras comprising a support, a slide guided thereon and carrying film engaging and moving means, said slide acting to wind the film during its downward movement only, a counter mechanism on said support including two toothed wheels, countersunk bearings in said support for said wheels, a pawl pivoted to said slide and lying in the path of one of said toothed wheels whereby upon downward movement of said slide, said wheel will be partially rotated.

17. A film winding mechanism for cameras comprising a support, a slide guided thereon and carrying film engaging and moving means, said slide acting to wind the film during its downward movement only, a counter mechanism on said support including two toothed wheels, counter sunk bearings in said support for said wheels, a pawl pivoted to said slide and lying in the path of one of said toothed wheels whereby upon downward movement of said slide, said wheel will be partially rotated, said pawl being rigid upon the downward movement of said slide and rockable upon the return movement thereof.

18. A film winding mechanism for cameras comprising a support, a slide guided thereon and carrying film engaging and moving means, said slide acting to wind the film during its downward movement only, a counter mechanism on said support including two toothed wheels, countersunk bearings in said support for said wheels, a pawl pivoted to said slide and lying in the path of one of said toothed wheels whereby upon downward movement of said slide, said wheel will be partially rotated, said pawl being rigid upon the downward movement of said slide and rockable upon the return movement thereof, and an elongated tooth rotatable with the first toothed wheel and engageable with said second toothed wheel upon each complete revolution of said first wheel.

19. A film winding mechanism for cameras comprising a support, a slide guided thereon and carrying film engaging and moving means, said slide acting to wind the film during its downward movement only, a counter mechanism on said support including two toothed wheels, countersunk bearings in said support for said wheels, a pawl pivoted to said slide and lying in the path of one of said toothed wheels whereby upon downward movement of said slide, said wheel will be partially rotated, said pawl being rigid upon the downward movement of said slide and rockable upon the return movement thereof, and an elongated tooth rotatable with the first toothed wheel and engageable with said second toothed wheel upon each complete revolution of said first wheel, and spring means normally urging said pawl to tooth engaging position.

LEW W. LESSLER.
CARL A. BORNMANN.